United States Patent

(12) United States Patent
Brace et al.

(10) Patent No.: US 6,457,011 B1
(45) Date of Patent: Sep. 24, 2002

(54) METHOD OF UPDATING A SHARED DATABASE IN A COMPUTER NETWORK

(75) Inventors: Colin H. Brace, Seattle, WA (US); Donald J. Hacherl, North Bend, WA (US); Jeffrey B. Parham, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/359,510

(22) Filed: Jul. 23, 1999

(51) Int. Cl.[7] .............................................. G06F 17/30
(52) U.S. Cl. ......................................... 707/10; 707/103
(58) Field of Search .............................. 707/10, 8, 201, 707/223, 224, 1, 2, 102, 103, 104, 100; 709/201, 223, 224; 714/1, 2

(56) References Cited

U.S. PATENT DOCUMENTS

| | | | | |
|---|---|---|---|---|
| 5,832,225 A | * | 11/1998 | Hacherl et al. | 709/223 |
| 6,012,059 A | * | 1/2000 | Neimat et al. | 707/8 |
| 6,157,944 A | * | 12/2000 | Pedersen | 709/204 |
| 6,163,855 A | * | 12/2000 | Shrivastava et al. | 714/4 |
| 6,167,427 A | * | 12/2000 | Rabinovich et al. | 709/201 |
| 6,189,043 B1 | * | 2/2001 | Buyukkoc et al. | 709/241 |
| 6,247,141 B1 | * | 6/2001 | Holmberg | 714/2 |

* cited by examiner

Primary Examiner—Sanjiv Shah
(74) Attorney, Agent, or Firm—Leydig, Voit & Mayer, Ltd.

(57) ABSTRACT

A Knowledge Consistency Checker (KCC) that periodically executes on each server of the computer network is provided. The KCC interacts with a data structure contained within a copy of a database located on each server, and with a replication program that executes on each server when called by the KCC. The data structure contains a list of server objects representing the servers in the network. Associated with each server objects is a list or replication objects that describe how the server is obtain a copy of a change to the database. Each replication object represents a server other than the server with which it is associated. The KCC uses the replication objects to inform the replication program from which servers to periodically request an update to the database and to the data structure. Thus, while each KCC is only responsible for creating the objects required for its own server, the replication topology of the entire network is provided to every server in the network by the periodic requests.

20 Claims, 16 Drawing Sheets

METHOD OF UPDATING A SHARED DATABASE IN A COMPUTER NETWORK

TECHNICAL FIELD

This invention relates generally to shared databases, more particularly, relates to a method of updating a shared database in a computer network.

BACKGROUND OF THE INVENTION

Servers on computer networks often share what is known as a "multi-master" database in which the servers all share responsibility for keeping the data current. Copies of parts or all of the database may be stored on several servers in such a system. When one server makes a change to a portion of the database, that change needs to be transmitted to all of the other servers that possess copies of that portion. One method of ensuring that this update occurs is described in U.S. Pat. No. 5,832,225 which is incorporated by reference herein in its entirety.

When a network that uses a multi-master database grows large, it becomes difficult to update current copies of the database on the servers within a reasonable period of time. This is due to the large number of "hops" (trips from one server to another) a between servers a particular change might have to make before it filters through the entire network. Under current updating schemes, if a server in a network of N servers makes a single change to the database, the server must transmit that change to N−1 servers. Thus, if all of the servers are making changes, a total of N*(N−1) updates must occur, thereby generating a tremendous amount of network traffic. The additional traffic can slow down the process considerably, thereby causing inconvenience to users and administrators alike. For example, if a user logs on to one server in a network and changes his password, he may not be able to use this password on another network server until the following day. Thus it can be seen that there is a need for a more efficient method for updating a multi-master database on a computer network.

SUMMARY OF THE INVENTION

In accordance with this need, a Knowledge Consistency Checker (KCC) that periodically executes on each server of the computer network is provided. The KCC interacts with a data structure contained within a copy of a database located on each server, and with a replication program that executes on each server when called by the KCC. The data structure contains a list of server objects representing the servers in the network. Associated with each server object is a list of replication objects that describe how the server is to obtain a copy of a change to the database. Each replication object represents a server other than the server with which it is associated. The KCC uses the replication objects to inform the replication engine from which servers to periodically request an update to the database and to the data structure. Thus, while each KCC is only responsible for creating the objects required for its own server, the replication topology of the entire network is provided to every server in the network by the periodic requests.

To ensure that all of the servers in the network receive all of the database changes, the KCC uses the Globally Unique IDs (GUIDs) to map out a virtual ring that creates a continuous path through all of the servers. When the KCC executes on a server, it orders the server objects in the replication map according to their GUIDs. The KCC then finds its server in the list and creates a replication object to the server ahead of it and a replication object to the server following it, and stores these objects under the server's object.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
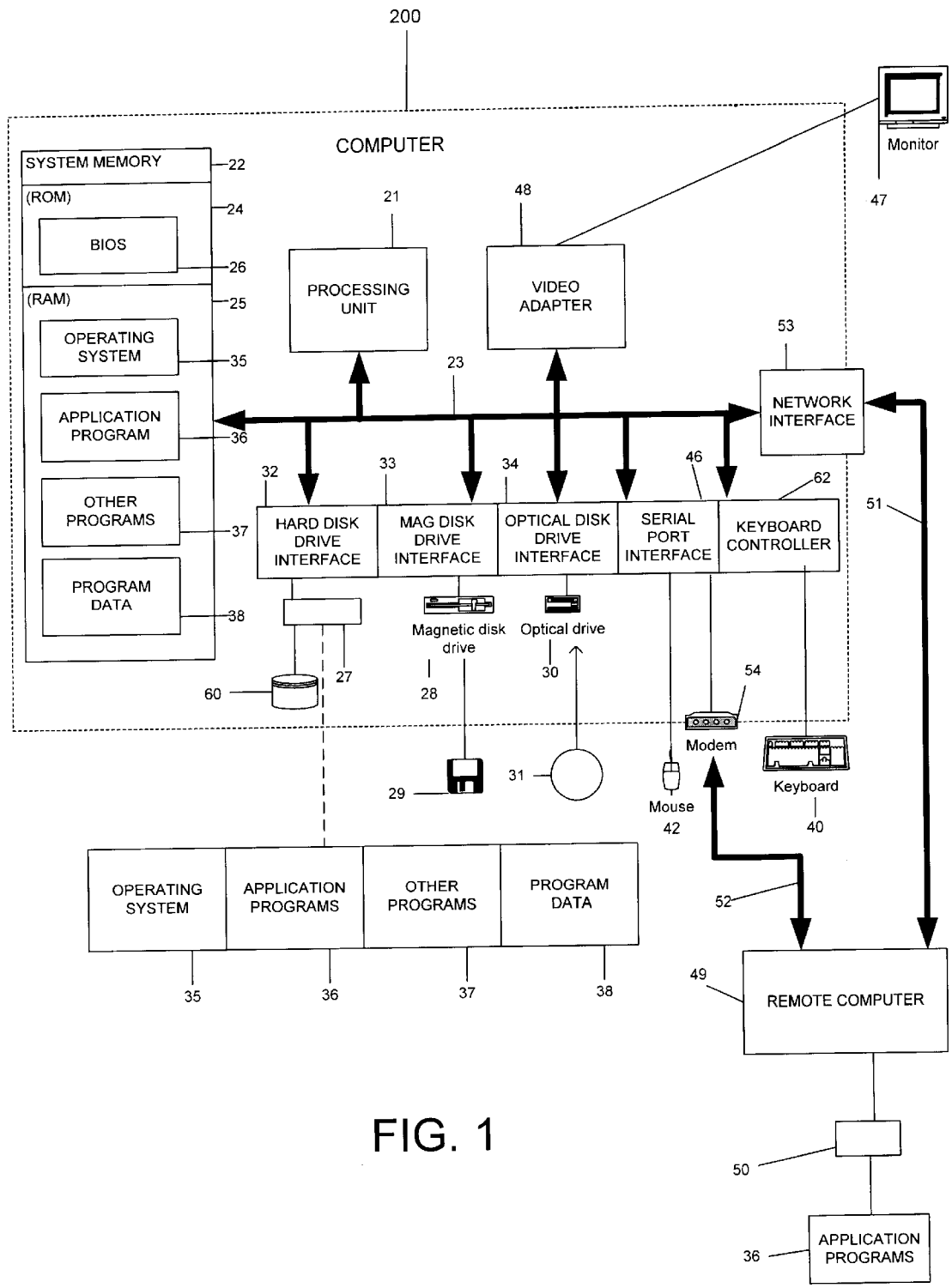
FIG. 1 is a block diagram generally illustrating an exemplary computer system on which the present invention resides.

Turning to the drawings, wherein like reference numerals refer to like elements, the invention is illustrated as being implemented in a suitable computer network. Although not required, the invention will be described in the general context of computer-executable instructions, such as one or more programs being executed by one or more personal computers in the network. Generally, a program includes routines, other programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, minicomputers, mainframe computers, and the like. The invention may also be practiced in distributed computing environments where tasks are performed by remote processing devices that are linked through a communications network. In a distributed computing environment, programs may be located in both local and remote memory storage devices.

With reference to FIG. 1, an exemplary system for implementing the invention includes a general purpose computing device in the form of a conventional computer 200, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24, random access memory (RAM) 25 and may also include a cache (not shown). A basic input/output system (BIOS) 26, containing the basic routines that help to transfer information between elements within the computer 200, such as during start-up, is stored in the ROM 24. The computer 200 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, programs and other data for the computer 200. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of programs may be stored on the hard disk 60, magnetic disk 29, optical disk 31, ROM 24 or RAM 25, including an operating system 35, one or more applications programs 36, other programs 37, and program data 38. A user may enter commands and information into the computer 200 through input devices such as a keyboard 40, which is typically connected to the computer 200 via a keyboard controller 62, and a pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The computer 200 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 200, although only a memory storage device 50 has been illustrated in FIG. 1.

The logical connections depicted in FIG. 1 include a local area network (LAN) 51 and a wide area network (WAN) 52. Such networking environments are commonplace in offices, enterprise-wide computer networks, intranets and the Internet. It will be appreciated that the network connections shown are exemplary and other means of establishing a communications link between the computers may be used. When used in a LAN networking environment, the computer 200 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, programs depicted relative to the computer 200, or portions thereof, may be stored in the remote memory storage device 50.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
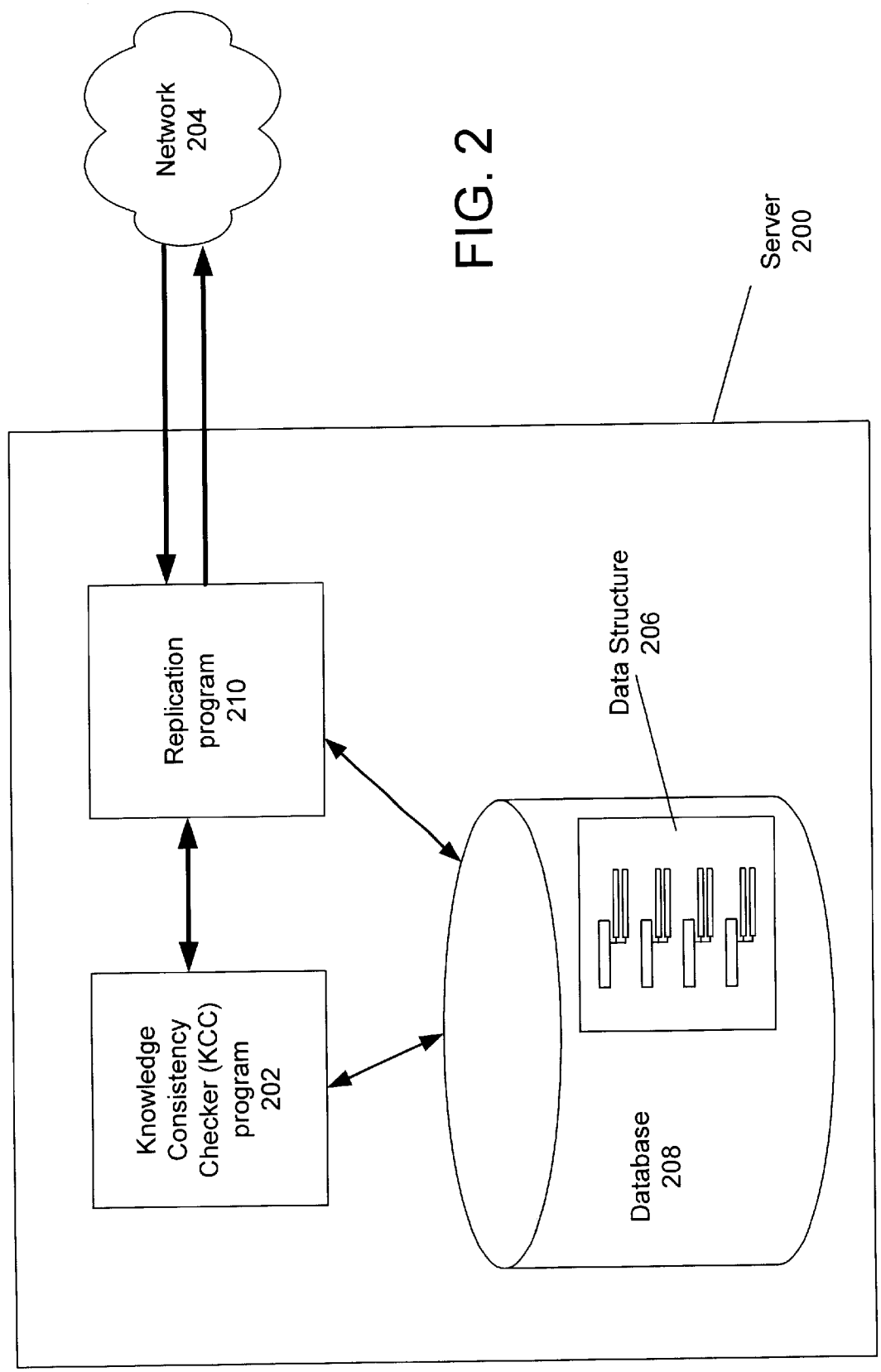
FIG. 2 is a block diagram showing a preferred embodiment of the invention.

Referring to FIG. 2, the invention is generally realized as a Knowledge Consistency Checker (KCC) program 202 that executes on the computer 200, which is typically a server, of a computer network 204. The KCC program 202 may reference and make changes to a data structure 206 contained within a database 208. The data structure 206 describes the "replication topology" of the network 204. The replication topology is the scheme that the servers of the network 204 use to maintain consistent copies of the database 208, thereby allowing multiple servers to share the database 208. In a preferred embodiment, the database is the "DIRECTORY SERVICE" of the "MICROSOFT WINDOWS 2000" brand operating system. One embodiment of the "DIRECTORY SERVICE" is generally described in U.S. Pat. No. 5,832,225, which is incorporated herein by reference in its entirety. A replication program 210 capable of executing on the server 200 cooperates with the KCC program 202 to request updates to the database 208 from other servers in the network 204, and make changes to the database 208 in based on the updates.

Figure 3:
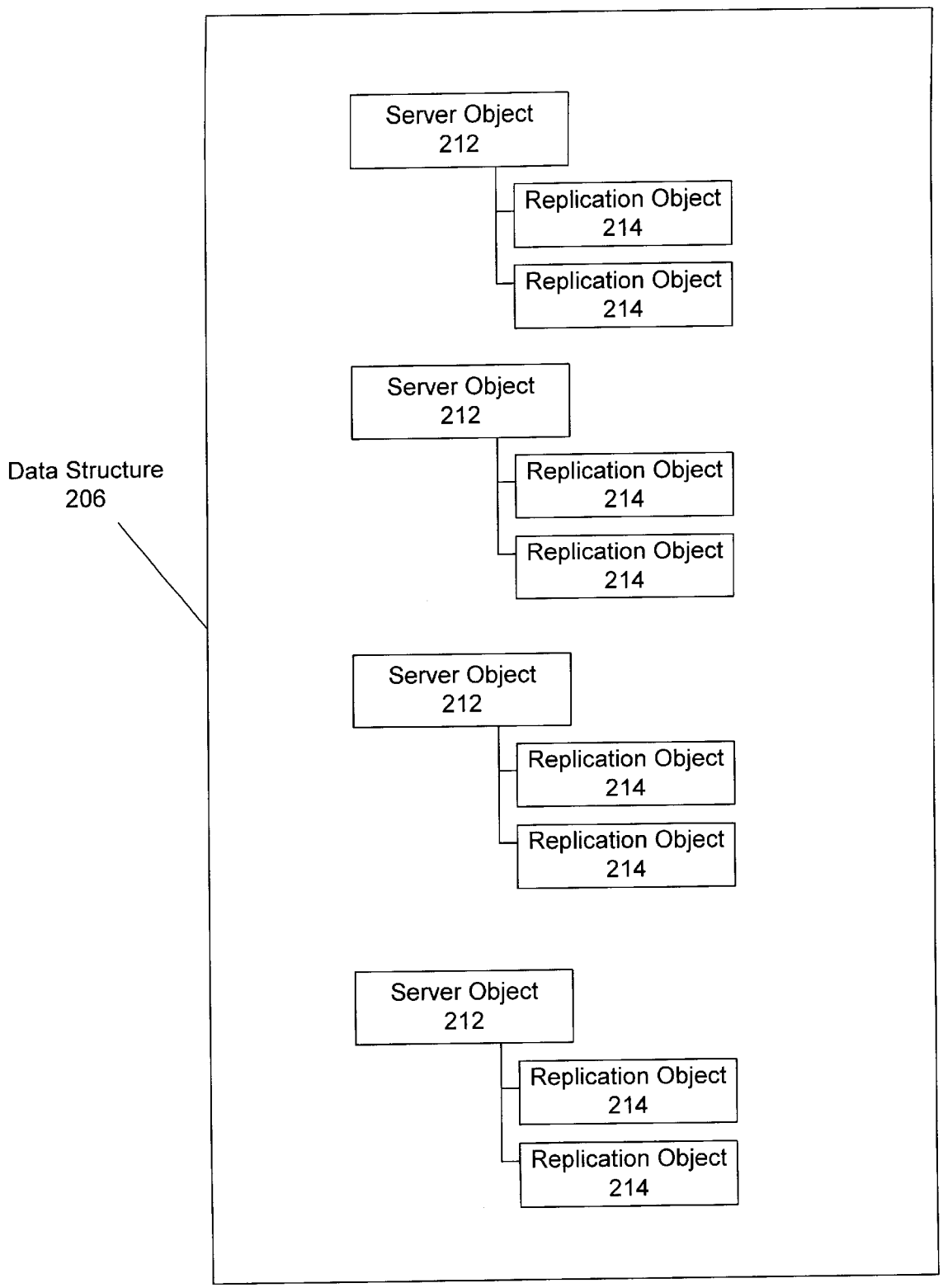
FIG. 3 is a block diagram showing an exemplary data structure used in the invention.

As shown more clearly in FIG. 3, the data structure 206 contains a plurality of server objects 212, wherein each server object 212 represents a server in the network 204. Upon creation, each server object 212 is assigned a unique identification code, which, in a preferred embodiment, is a Globally Unique ID (GUID). Associated with each server object 212 is one or more replication objects 214 that are usable by the represented server to request a copy of a change to the database 206.

When a server in the network 204 makes a change to its copy of the database 208, that change should be replicated and disseminated to all other servers in the network 204. To ensure that each of the servers in the network receive all database changes, the KCC program 202 periodically executes on each server of the network 204 according to the steps of the flowchart of FIG. 4. At step 400, the KCC program 202 references the data structure 206 and orders the server objects 212 in circular sequence according to their respective GUIDs, thereby creating a virtual ring of servers. It is understood that this arrangement of the servers may have nothing to do with the physical layout of the network. The KCC program 202 then finds the server object 212 which represents the server on which it is running at step 402. It then creates a replication object 214 that refers to the sequentially previous server object 212 and a replication object 214 that refers to the sequentially following server object 212, and stores these objects under the represented server's object at step 404.

At step 406, the KCC program 202 calls the replication program 210 and passes the replication objects 214 associated with the represented server's object 212 to the replication program 210. The replication program 210 responds by submitting a request to each server referred to be the replication objects 214. The servers receiving the requests respond by reconciling their copies of the database 206 with the copy stored on the represented server as described in U.S. Pat. No. 5,832,225, incorporated herein by reference. The KCC program 202 then returns to step 400, where it waits until it is required to execute again. The KCC program may re-execute at any appropriate time, such as after a fixed interval, in response to being called by another procedure, or in response to being invoked by a user.

Figure 5:
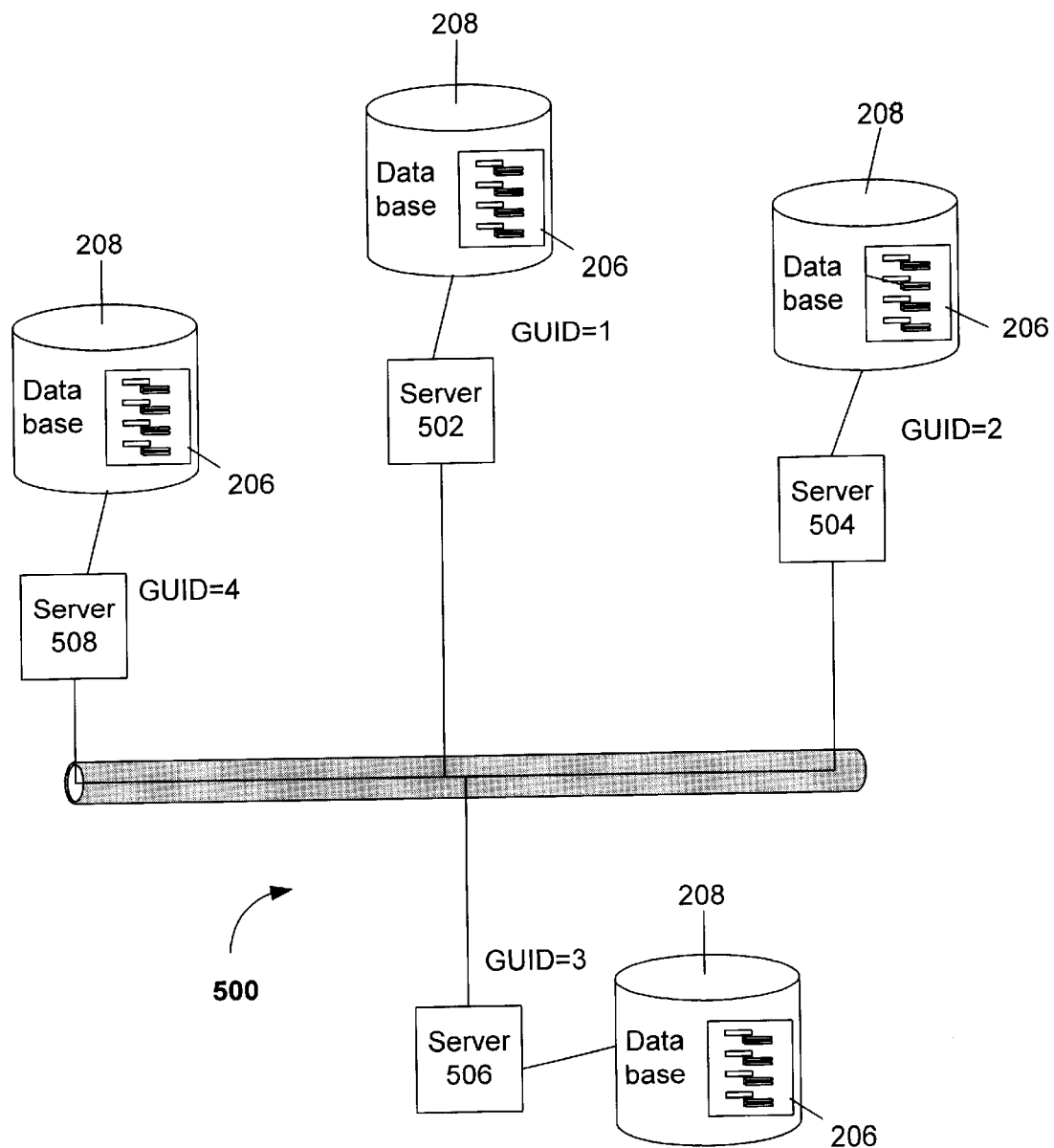
FIG. 5 is a diagram of an exemplary computer network employing the invention.
Figure 6:
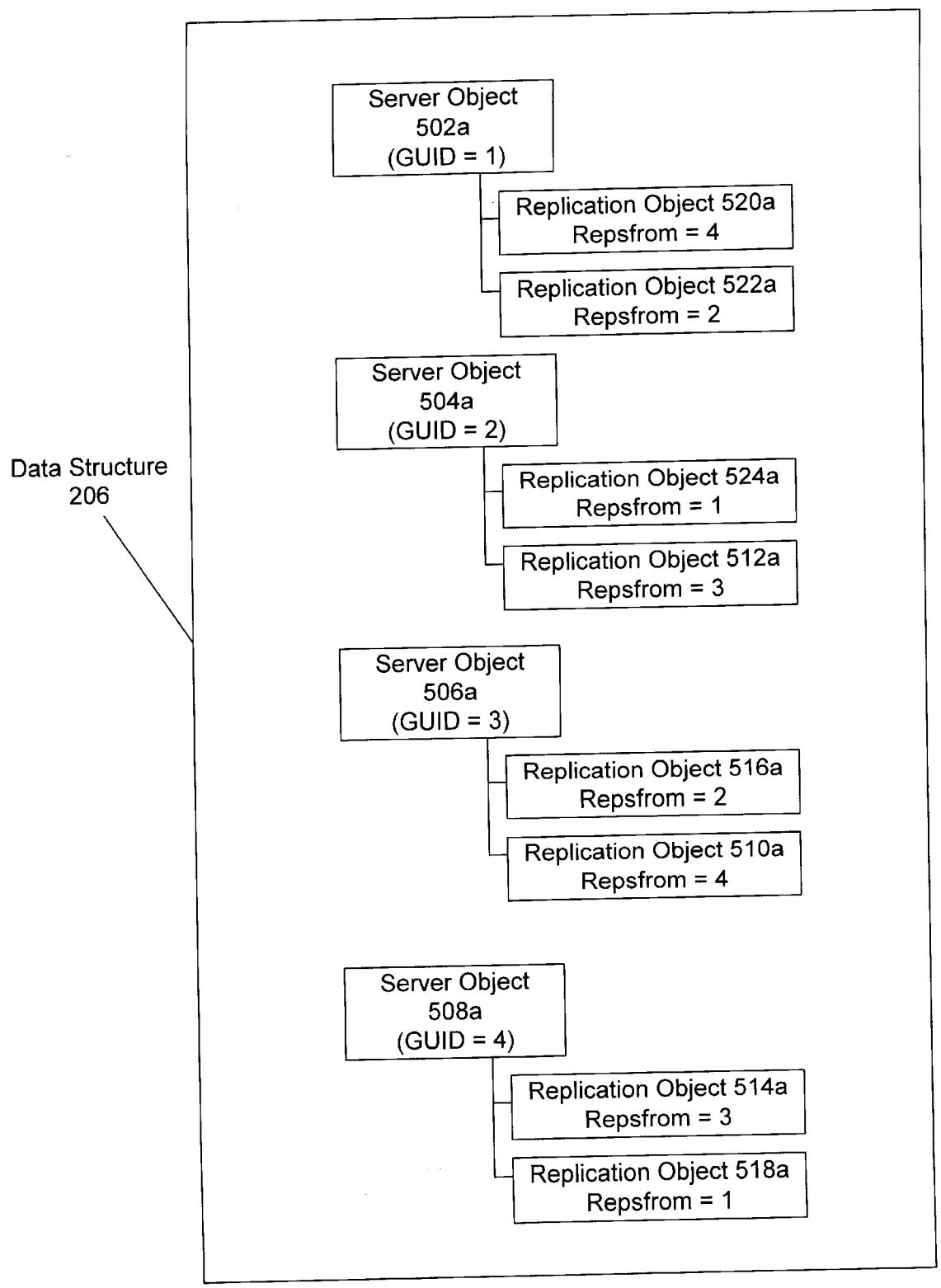
FIG. 6 is a block diagram of a data structure representing the replication topology that may be used in the exemplary network of FIG. 5.
Figure 7:
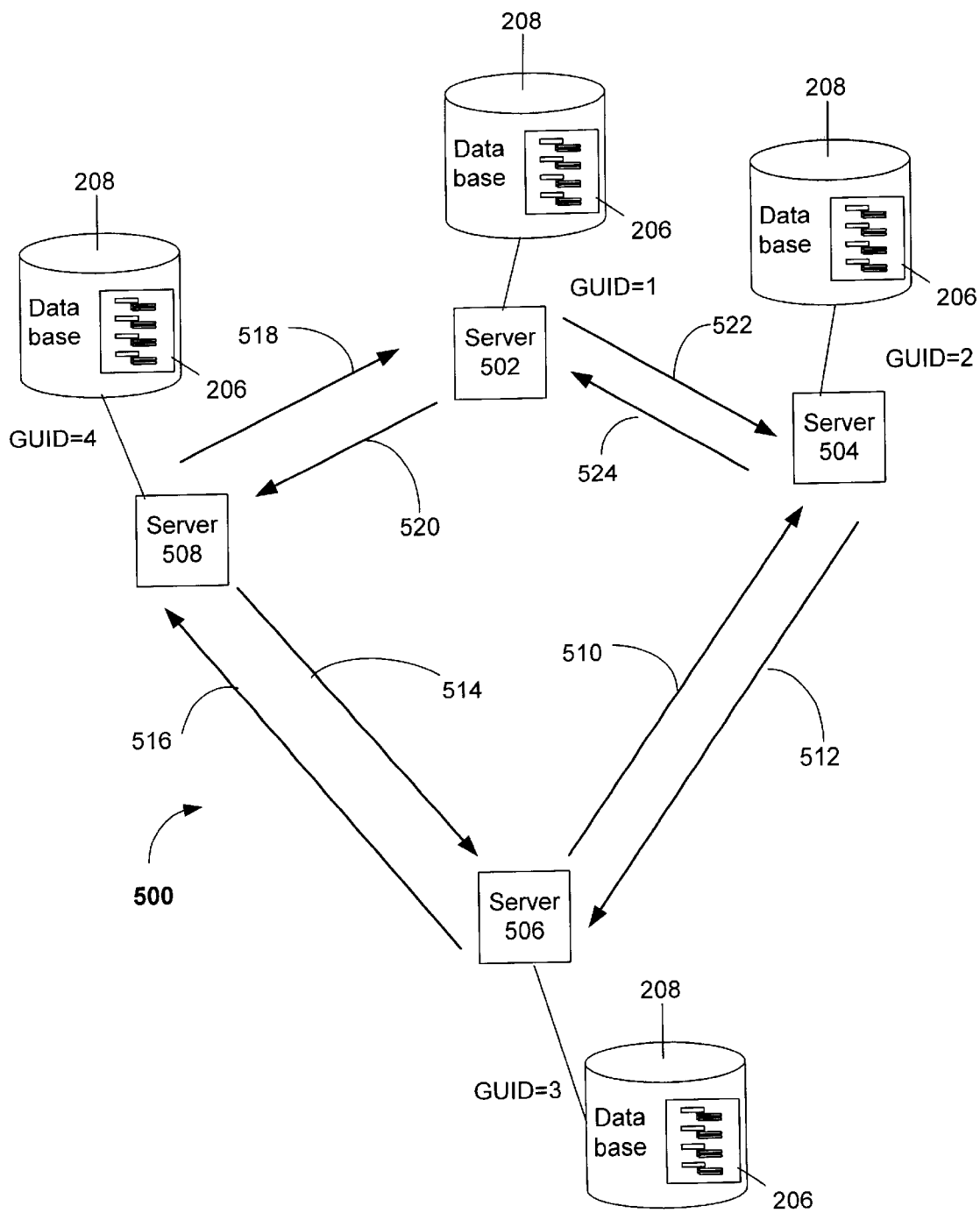
FIG. 7 is a diagram showing the flow of update requests in the network of FIG. 5.

To illustrate an example of the replication paths created by the KCC program 202, reference is made to FIGS. 5–7. Each of the servers 502–506 of the illustrated network 500 (FIG. 5) maintains a copy of the database 208 along with a copy of the data structure 206. For this example, it will be assumed that the servers 502–506 have GUIDs of 1–4 respectively. An actual GUIDs is typically 128 bits, although other types of unique identifiers are contemplated. Single digit numbers are being used in this example only for the sake of simplicity. As shown best in FIG. 6, the KCC program 202 will sequentially order the server objects 212 by their GUIDs. The server objects 502a, 504a, 506a and 508a each represent the respective servers 502, 504, 506 and 508 of the network 500. The KCC program 202 will also create replication objects 510a–524a for the server objects 502a–508a. Each server object will initially have two replication objects—one referring to the previous server object in the sequence and one referring to the following server object in the sequence.

Referring to FIG. 7, replication request paths 510–524 are shown to illustrate the use of the replication objects 510a–524a of FIG. 5. Each of the servers of the network 500 requests updates from other servers in the network 500 along the request paths. For example, an instance of the KCC program 202 executing on the server 506 periodically requests updates from the servers 504 and 508 along the replication request paths 510 and 516 respectively. By comparing FIGS. 5 and 7, it can be seen that the four servers may have a replication topology that is quite different from the physical topology. The physical arrangement of the network 204 is not important, and the only assumption made is that the servers 502–508 have relatively good connectivity, as would be the case if they were running the "MICROSOFT WINDOWS 2000" brand operating system and enumerated within the same "SITE" of the "DIRECTORY SERVICE," for example. In order ensure that the copies of the data structure 206 are kept up to date on the various servers, the data structure 206 is incorporated into the database 208 so that any changes to the data structure are automatically propagated along with the changes in the database. It is contemplated, however, that the data structure 206 may be stored and maintained separately from the database 208.

Figure 8A:
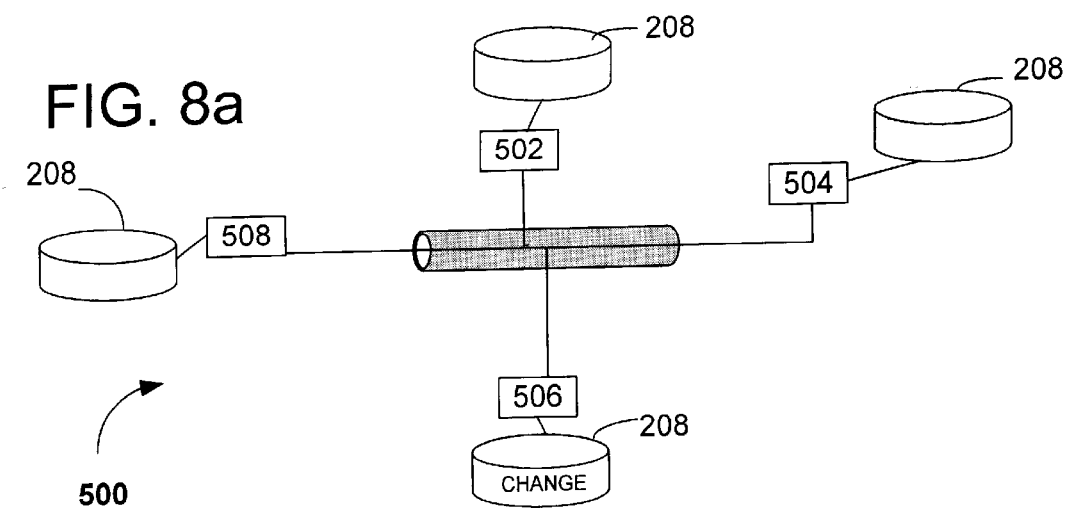
FIGS. 8a–8c is a diagram showing the flow of a change made on one of the servers of the network of FIG. 5.
Figure 8B:
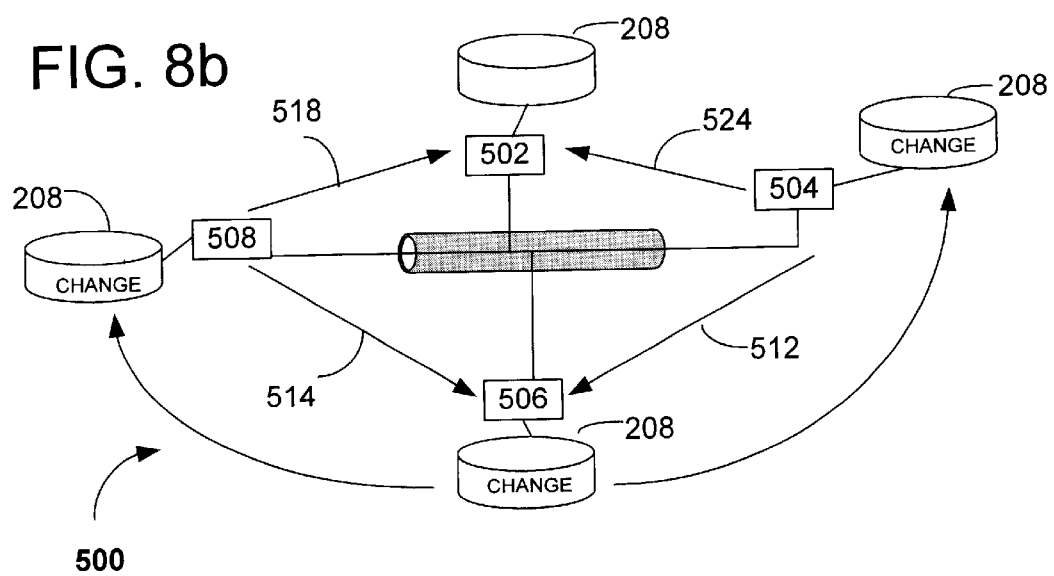
Figure 8C:
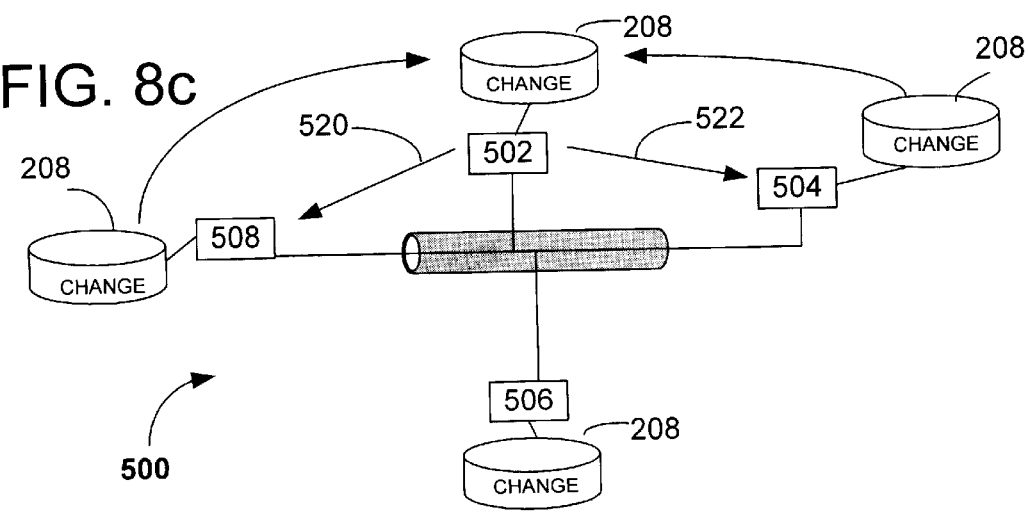

Using the replication topology shown in FIG. 7, a change made to the database 208 by the server 506, for example, propagates through the network as shown in FIGS. 8a–c. In FIG. 8a, the server 506 makes some addition and/or deletion, labeled "CHANGE," to its copy of the database 208. When the KCC program 202 runs on servers 504 and 508, it will cause the replication program 210 to request updates from the server 506 as well as the server 502 along request paths 512, 514, 518 and 524 (FIG. 8b). The reconciliation process will then occur, during which the changed data will be transferred to the servers 504 and 508. The replication program 210 running on the servers 504 and 508 will then incorporate the change into their respective copies of the database 208. When the KCC program 202 subsequently executes on the server 502, it will cause the replication program 210 to request updates from the servers 504 and 508 along the paths 520 and 522 (FIG. 8c), and receive the change from the two servers. An instance of the replication program 210 executing on the server 502 will then incorporate the change into its copy of the database 208. At this point, the entire network will possess a current copy of the database 208.

To ensure that replications of the database 206 can still be propagated throughout the network in spite of the failure of one of the servers, the KCC program 202 running on a server may "bypass" another server which does not respond to a request for an update to the database 206. In one implementation, the KCC program 202 bypasses "critical" servers after 5 successive failures in a 2 hour period, and bypasses "non-critical" servers after 10 successive failures in a 12 hour period. A server is considered critical if, according to the replication topology described by the data structure 202, it immediately precedes or immediately follows the server on which the KCC program 202 is running. Otherwise, a server is considered to be non-critical.

Figure 9:
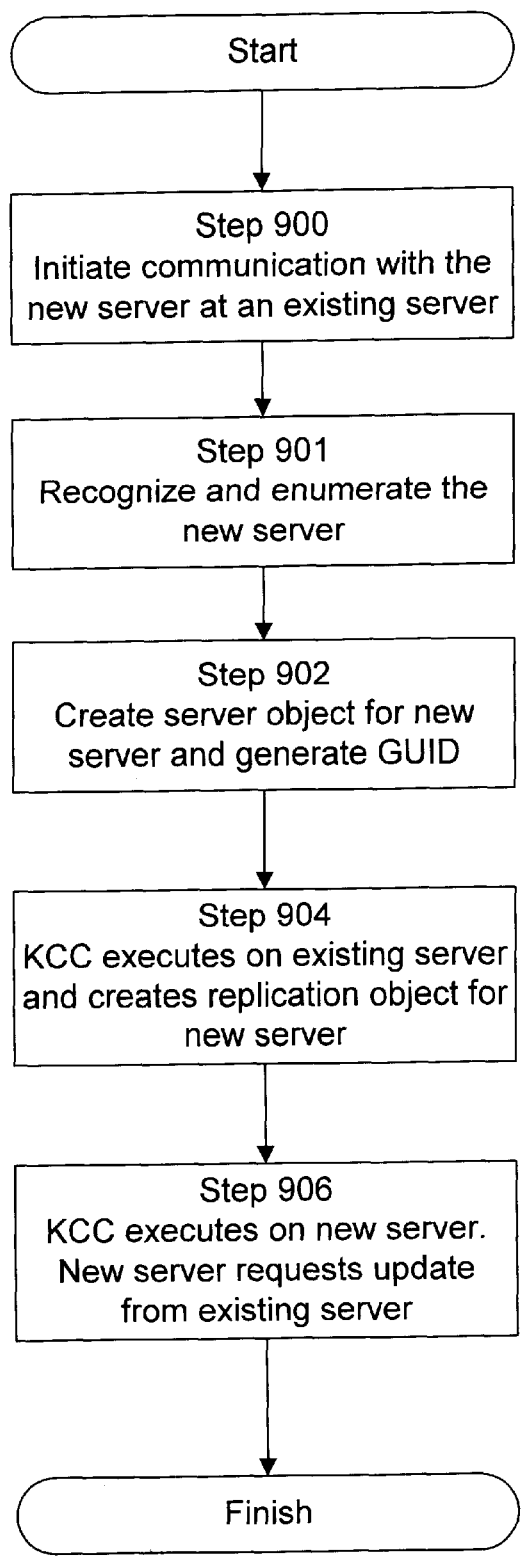
FIG. 9 is a flowchart generally depicting the steps for adding a server to a network in which the invention is implemented.
Figure 10:
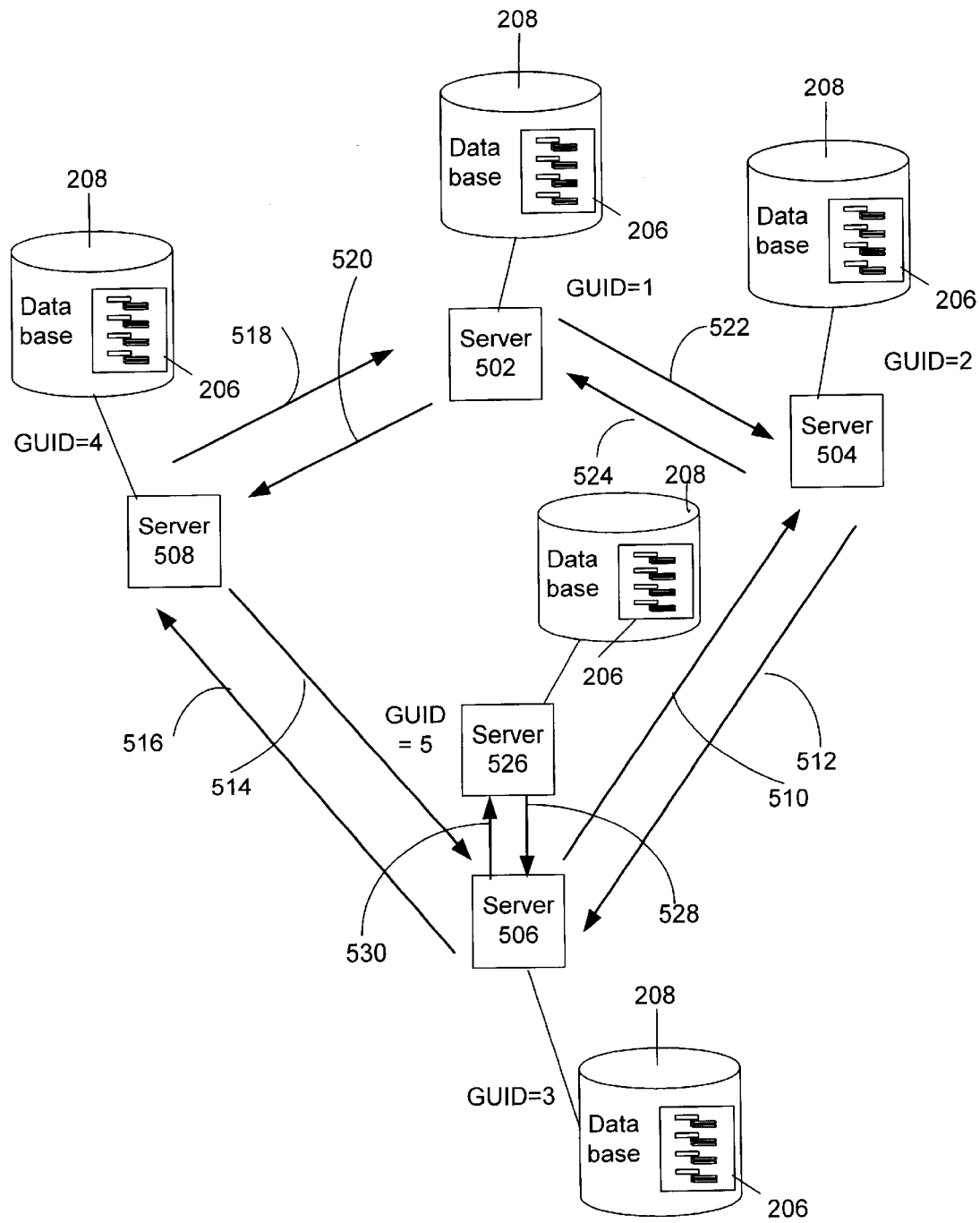
FIGS. 10 and 12 are diagrams depicting the addition of a server to a network in which the invention is implemented.

To add a new server to the network and incorporate it into the existing replication topology, the process shown in the flowchart of FIG. 9 are used. At step 900, communication is initiated between the new server and one of the existing servers of the network. At step 901, the operating system of the existing server recognizes and enumerates the new server. As part of the enumeration process, a server object 212 having a GUID is created by the operating system of the existing server and stored in the data structure 206. The creation of new objects to represent new devices in a network is well known technique used in the MICROSOFT WINDOWS NT/WINDOWS 200 brand operating systems. At step 902, the operating system of the new server recognizes and enumerates the existing server, and creates a server object 212 in its own version of the data structure 206. At this point, the server structure 206 of the new server does not have all of the replication topology of the existing server, but is capable of requesting an update from the existing server on which it was first introduced to the network. At step 904 the KCC program 202 executes on the existing server as described in the flowchart of FIG. 4. The server object 212 of the new server will then be placed in the correct position in the sequence of server objects of the data structure 206 on the existing server, and the appropriate replication objects will be created. At step 906, the KCC program 202 will execute on the new server according to FIG. 4, and the replication program 210 running on the new server will request an update of the database 208 from the existing server. When the update is received along with the complete version of the data structure 206, the new server will be completely integrated into the replication topology of the network.

Figure 11:
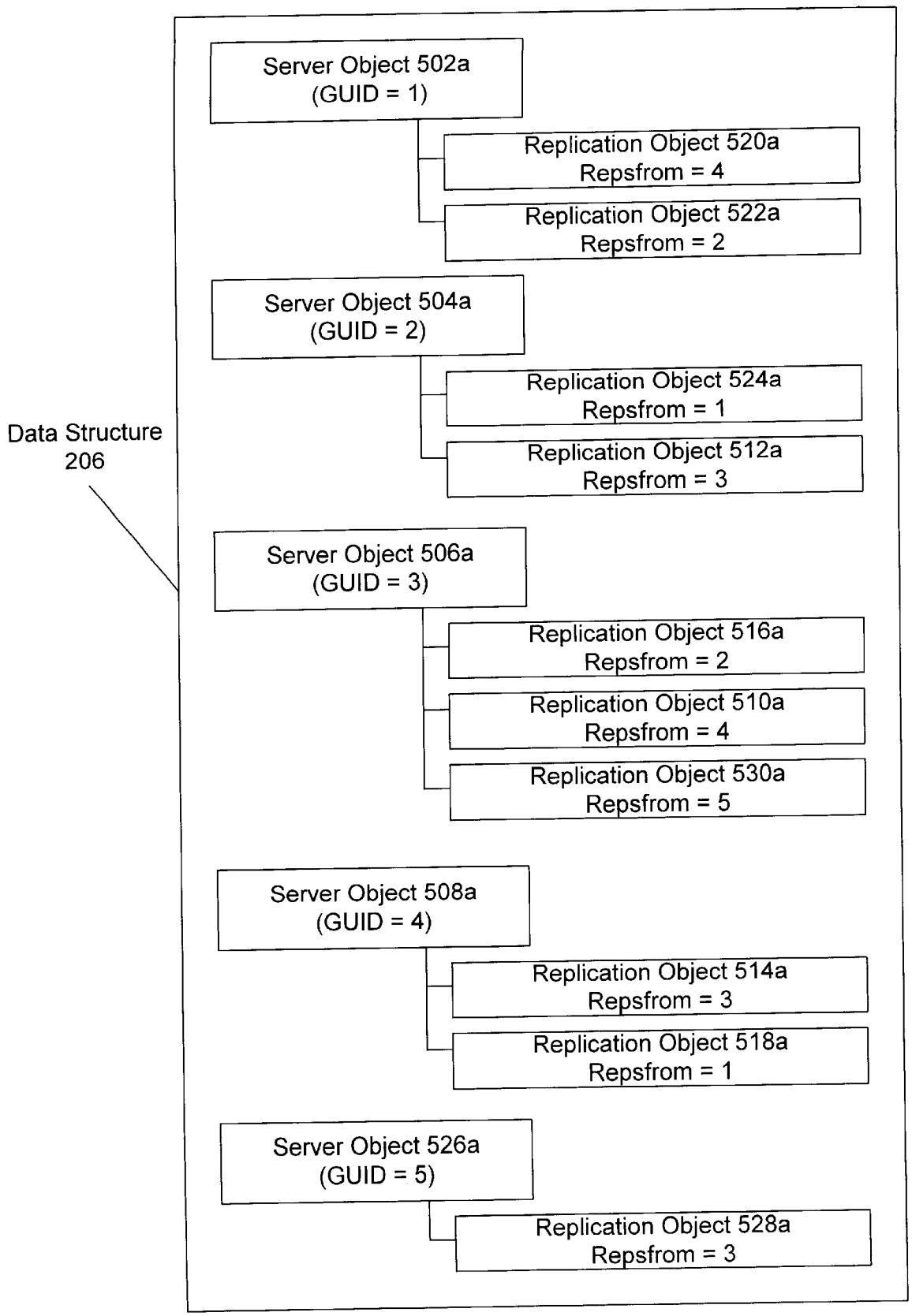
FIGS. 11, 11a and 13 are block diagrams showing the changes made on an existing server and a newly added server to a data structure representing the replication topology of a network in which the invention is implemented.
Figure 11A:
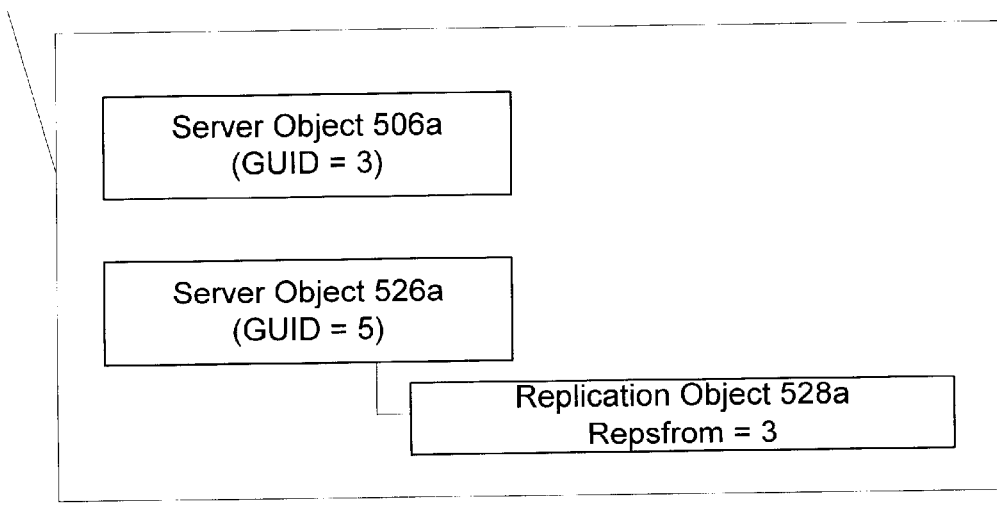

To illustrate the process of integrating a new server into an existing replication topology as described in the flowchart of FIG. 9, reference is made to FIGS. 10–14. When a new server 526 (FIG. 10) is added to the network at the existing server 506, a new server object 526a representing the new server 526 is created in the copy of the data structure 206 the server 506 (FIG. 11). It will be assumed that the GUID for the new server object 526a is five. As part of the enumeration process on the server 526, server objects 506a and 526a and are created and stored in the copy of the data structure 206 stored in the server 526 as shown in FIG. 11a. A replication object 530a referring to the server object 506a is then created and associated with the server object 526a to enable the server 526 to request an update from the server 506.

Figure 4:
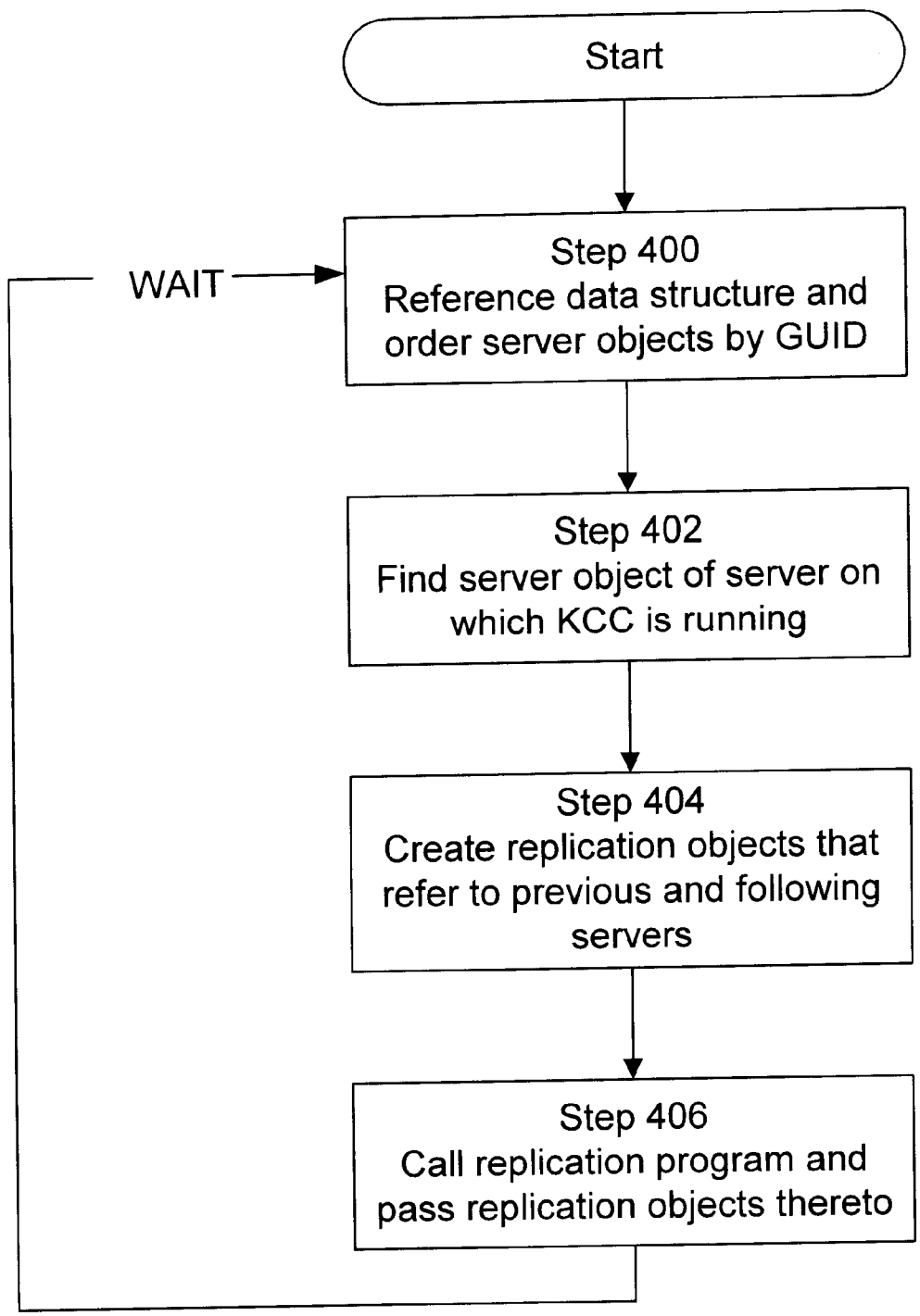
FIG. 4 is a flowchart generally depicting the flow of control of a preferred embodiment of the KCC.
Figure 12:
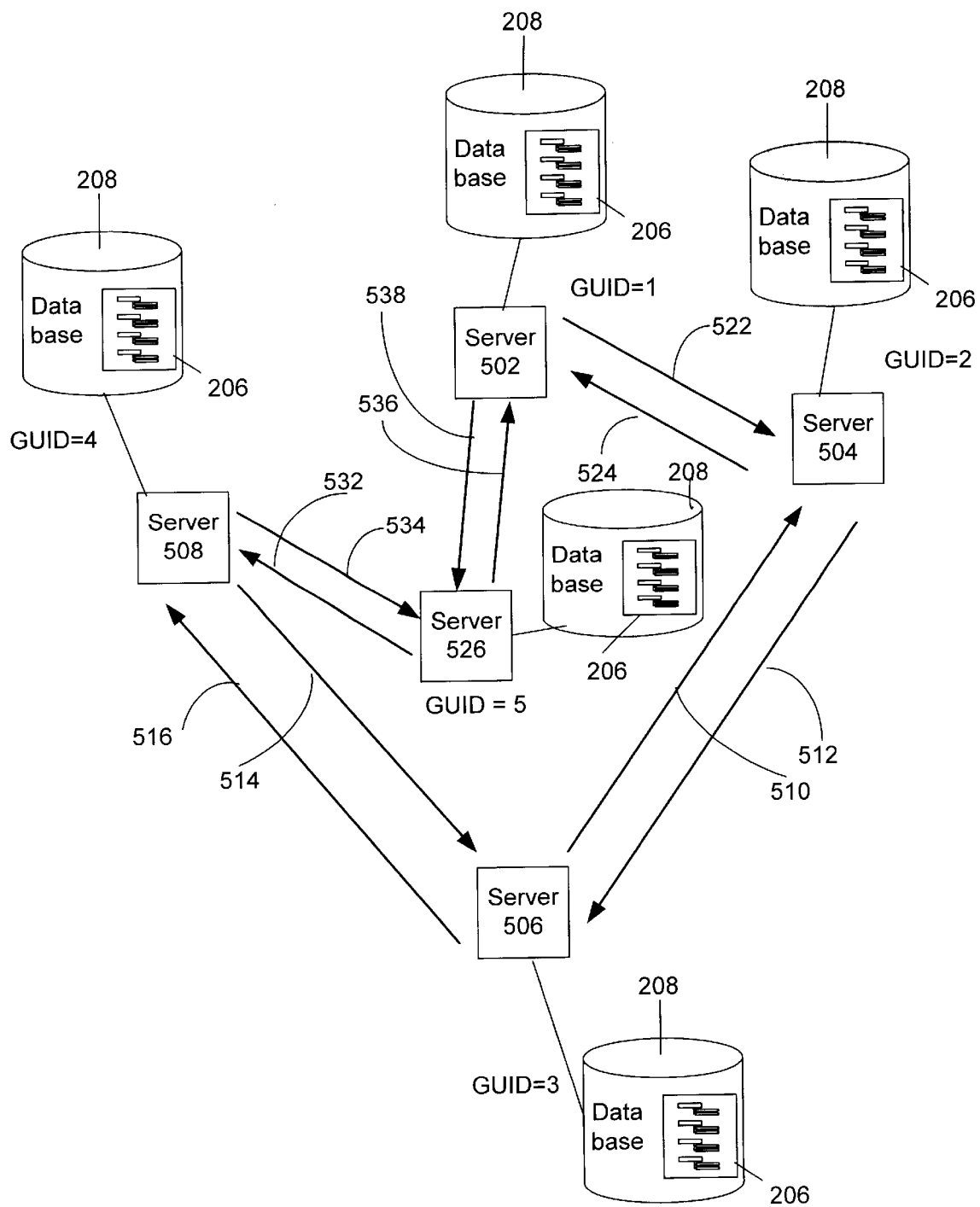
Figure 13:
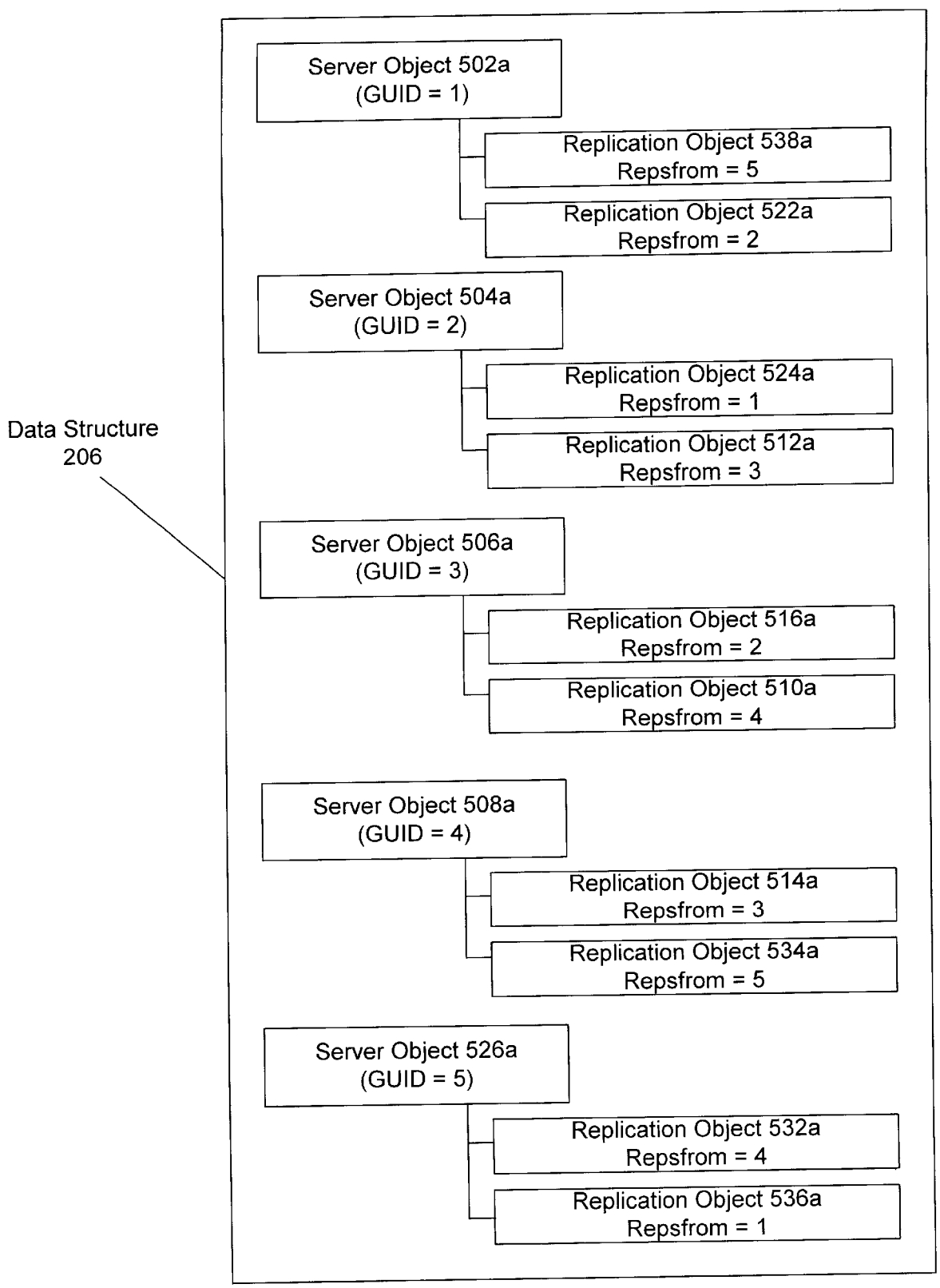

When the KCC program 202 executes on the existing server 506, it will reorder the server objects 502–508 and 526 according to their GUIDs and created replication objects according to the steps of FIG. 4. Upon reordering, the replication objects 518a, 520a, 528a and 530a will be deleted and new replication objects 532a, 534a, 536a and 538a will be created in order to insert the new server 526 into its appropriate position according to the GUID of the new server object 526a (FIGS. 12 and 13). It can be seen that the new server 526 will request updates from the existing servers 502 and 508. This new replication topology as reflected in the data structure 206 shown in FIG. 13 will propagate from the existing server 506 to the new server 526, as well as to the rest of the servers in the network as previously described in conjunction with FIGS. 8a–8c.

In order to minimize the number of hops over which a change to the database 208 will have to travel, the KCC program 202 can create extra or "shortcut" replication objects in addition to the two objects that are initially created. When the KCC program 202 executes on a server, it counts the number of servers presently in the network and determines the minimum number of links that the home server needs according to the following algorithm: $f(n)=2n^2+6n+6$, where $f(n)=$the number of servers and n is the number of replication objects required. If the number of replication objects associated with a server object is below the minimum, the KCC program 202 creates a shortcut replication object to another server in the network. The server to which the shortcut replication object will refer is chosen randomly from all of the servers represented in the data structure 206. The use of this algorithm generally keeps the number of hops to three or less. Additionally, a network administrator may manually delete and create replication objects through a user interface. This capability may be useful if the randomly created "shortcut links" turn out to be inefficient. To maintain an even distribution of the randomly created shortcut replication paths, the KCC program 202 deletes the oldest shortcut replication object when it detects that the number of servers in the network has grown significantly. Thus, when it creates new shortcut replication objects to replace the deleted replication objects, the new replication paths will be just as likely to point to the newly added servers as the old servers. Deleting the oldest replication object when the number of servers increases by between 9 and 11 has proven effective. To prevent an excessive number of servers from simultaneously creating shortcut links, it is preferred that each server randomly choose a number between (and including) 9 and 11 as a threshold. This process is further illustrated in the flowchart of FIG. 14.

Figure 14:
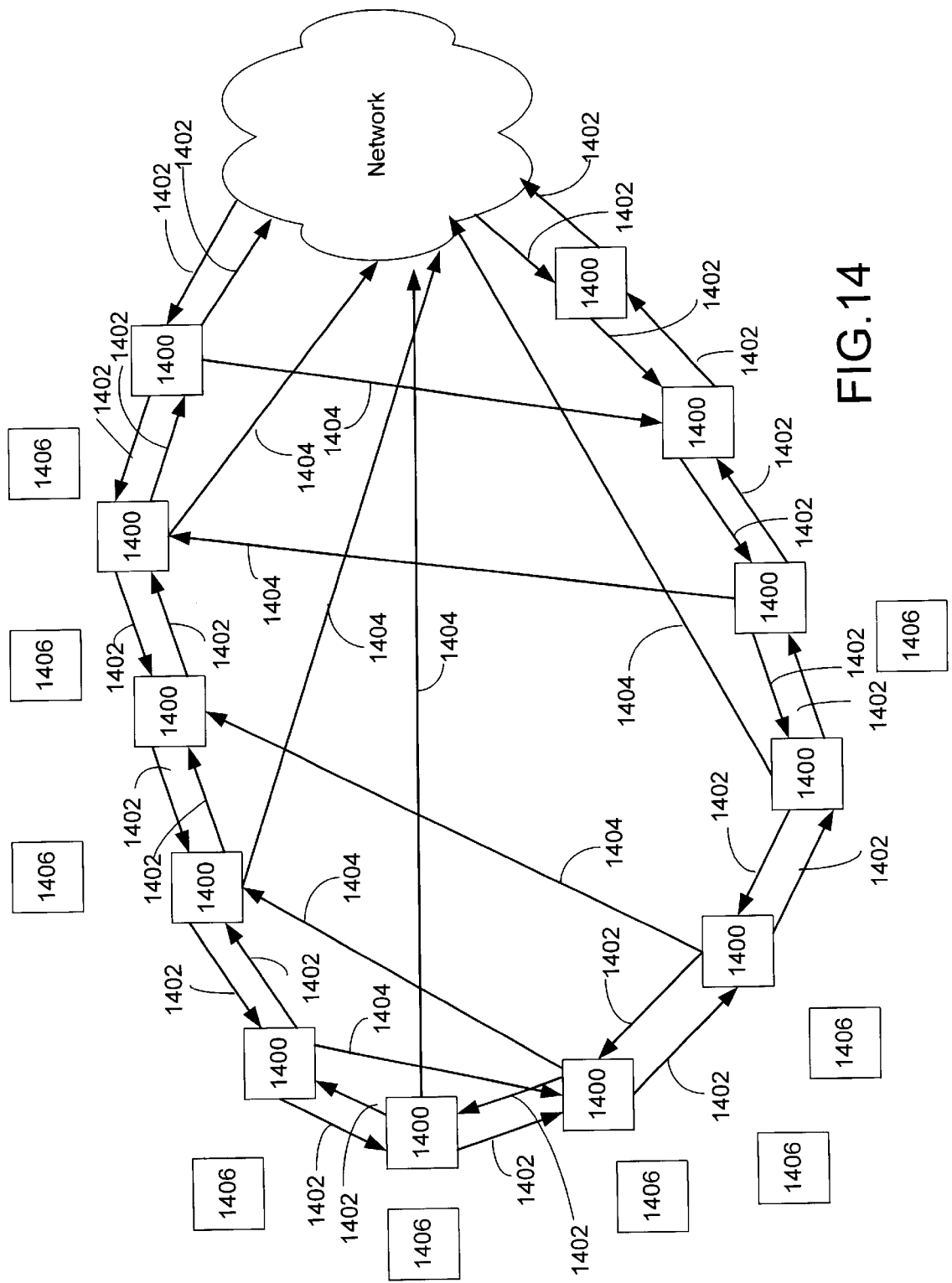
FIGS. 14–15 show the deletion and addition of replication paths that occurs when a number of servers is added to a network in which the invention is implemented.
Figure 15:
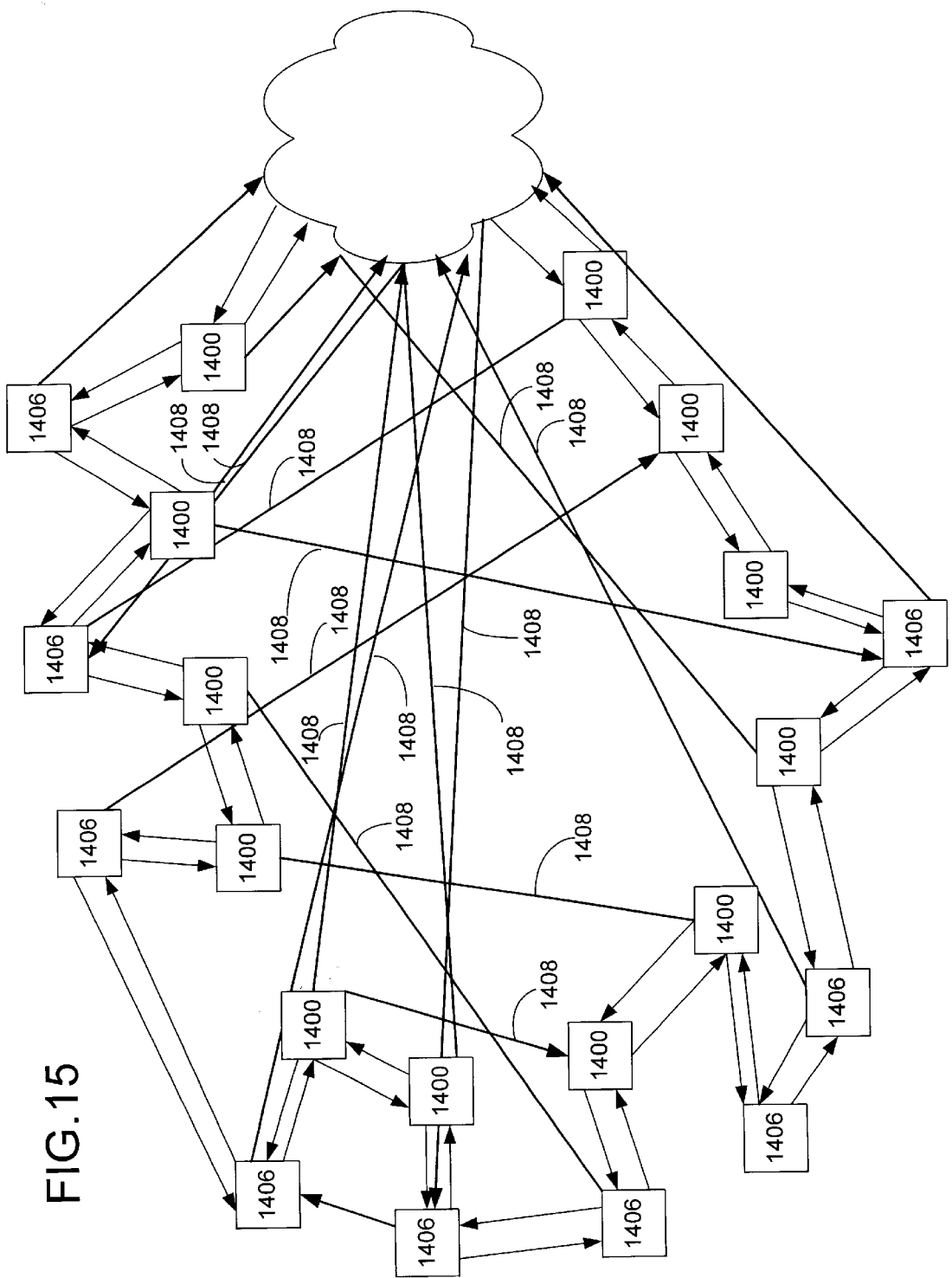

Referring to FIG. 14, a network is shown as having at least forty-two existing servers 1400, which, according to the above stated algorithm, requires that there be at least three replication links per server. It is assumed for this example that each server 1400 will create a new shortcut replication link when nine or more servers are added to the network, although, as stated previously, a random value between nine and eleven is preferred. In FIG. 14, each existing server 1400 has the initial two replication paths 1402 and one randomly created shortcut replication path 1404. If nine new servers 1406 are added to the network simultaneously, for example, the KCC program 202 running on each of the existing servers will incorporate the new servers 1406 into the existing replication topology, as shown in FIG. 15, then delete the oldest shortcut replication objects, thereby removing the oldest shortcut replication paths. In this example, each of the server objects of the existing servers has only one shortcut replication object, so it gets deleted. As the KCC program 202 periodically executes on each existing server 1400 as well on each newly integrated server 1406, it will create new shortcut replication paths 1408 which will have as good of a probability of pointing to the newly integrated servers 1406 as to the existing servers 1400, as shown in FIG. 15.

In view of the many possible embodiments to which the principals of this invention may be applied, it should be recognized that the embodiment described herein with respect to the drawing figures is meant to be illustrative only and should not be taken as limiting the scope of the invention. For example, the KCC program 202 and the replication program 210 may be implemented as a single program. It should also be recognized that the ordering and the specific implementation of the program steps described above and depicted in the flowcharts of FIGS. 4 and 9 is may be altered in obvious ways. Furthermore, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. In a computer network having a plurality of existing servers, wherein a database is shared among the existing servers, a method of providing access to the database to a new server comprising the steps of:

on an existing server, referencing a data structure containing a plurality of server objects ordered in a sequence, each server object representing a server in the network, wherein there are replication objects associated with each server object, the replication objects being usable by the represented server to request an update to the database from the server preceding and the server following the represented server in the sequence;

creating a first temporary replication object on the existing server, wherein the first temporary replication object is usable by the existing server to request an update to the database from the new server;

creating a second temporary replication object on the new server, wherein the second temporary replication object is usable by the new server to request an update to the database from the existing server;

creating a new server object representing the new server in the data structure;

inserting the new server object into the sequence between a first and a second server object;

modifying the replication objects associated with the first and second server objects to refer to the new server object;

creating new replication objects associated with the new server object, the new replication objects being usable by the new server to request an update to the database from the first and second servers; and after completion of the creating step, deleting the temporary replication objects.

2. The method according to claim 1, wherein each server object has a unique identification number and the server objects are ordered according to their respective identification numbers.

3. The method according to claim 1, wherein the update to the database includes an update to the data structure.

4. The method according to claim 1, wherein the database includes the data structure.

5. The method according to claim 1, wherein each of the plurality of server objects has a globally unique identification number, and wherein the server objects of the plurality of server objects are ordered in the sequence according to their respective globally unique identification numbers.

6. The method according to claim 5, further comprising ordering the plurality of server objects into the sequence.

7. The method according to claim 5, wherein the ordering step comprises ordering the server objects to create a virtual ring representing the plurality of existing servers.

8. The method of claim 1, wherein the modifying step comprises:

causing the first server object to stop referring to the second server object and to start referring to the new server object; and causing the second server object to stop referring to the first server object and to start referring to the new server object.

9. The method according to claim 1, further comprising:

on the existing server,
recognizing the new server; and
enumerating the new server.

10. The method according to claim 1, wherein the step of referencing a data structure comprises referencing a first version of the data structure on the existing server, the method further comprising:

on the new server,
recognizing the existing server;
enumerating the existing server; and
creating an object representing the existing server in a second version of the data structure.

11. The method according to claim 1, wherein the step of referencing a data structure comprises referencing a first version of the data structure on the existing server, and wherein the new server has a second version of the data structure the method further comprising:

on the new server,
requesting an update to the database from the existing server;
in response to the request, receiving a copy of the first version of the data structure from the existing server; and updating the second version of the data structure based on the first version of the data structure.

12. In a computer network having a plurality of existing servers, wherein a database is shared among the existing servers, a method of providing access to the database to a new server comprising the steps of:

on an existing server, referencing a data structure containing a plurality of server objects ordered in a sequence, each server object representing a server in the network, wherein there are replication objects associated with each server object, the replication objects being usable by the represented server to request an update to the database from the server preceding and the server following the represented server in the sequence;

creating a new server object representing the new server in the data structure;

inserting the new server object into the sequence between a first and a second server object;

modifying the replication objects associated with the first and second server objects to refer to the new server object; and creating new replication objects associated with the new server object, the new replication objects being usable by the new server to request an update to the data set from the first and second servers;

and when the number of server objects exceeds a predetermined number performing the steps of: for each server object, associating a new replication object with the server object, wherein the new replication object refers to another server object that is randomly chosen from the sequence and wherein the new replication object is usable by the server represented by the server object to request an update to the database from the server represented by the randomly chosen server object.

13. The method of claim 12, wherein the predetermined number is derived from the function $f(n)=2n^2+6n+6$, wherein $f(n)$ is the number of servers in the network and $n$ is the number of replication objects required by each server object.

14. The method of claim 12, wherein when the number of server objects increases by at least nine at a time, a new replication object created during the associating step is chosen according to the order of creation and deleted.

15. The method of claim 12, wherein when the number of server objects increases by a value randomly chosen from between and including nine and eleven, a new replication object created during the associating step is chosen according to the order of creation and deleted.

16. The method according to claim 12, wherein each of the plurality of server objects has its own globally unique identification number, and wherein the server objects of the plurality of server objects are ordered according to their respective globally unique identification numbers.

17. A computer-readable medium having computer-executable instructions for performing steps comprising:

referencing a data structure on an existing server, the data structure containing a plurality of server objects ordered in a sequence, each server object representing a server in a network, wherein there are replication objects associated with each server object, the replication objects being usable by the represented server to request an update to the database from the server preceding and the server following the represented server in the sequence;

creating a first temporary replication object on the existing server, wherein the first temporary replication object is usable by the existing server to request an update to the database from the new server;

creating a second temporary replication object on the new server, wherein the second temporary replication object is usable by the new server to request an update to the database from the existing server;

creating a new server object representing a new network server in the data structure; inserting the new server object into the sequence between a first and a second server object;

modifying the replication objects associated with the first and second server objects to refer to the new server object;

creating new replication objects associated with the new server object, the new replication objects being usable by the new server to request an update to the database from the first and second servers; and after completion of the creating step, deleting the temporary replication objects.

18. The computer-readable medium of claim 17, wherein each server object has a unique identification number and the server objects are ordered according to their respective identification numbers.

19. The computer-readable medium of claim 17, wherein the update to the database includes an update to the data structure.

20. The computer-readable medium of claim 17, wherein the database includes the data structure.

* * * * *

UNITED STATES PATENT AND TRADEMARK OFFICE
CERTIFICATE OF CORRECTION

PATENT NO.     : 6,457,011 B1
DATED          : September 24, 2002
INVENTOR(S)    : Brace et al.

It is certified that error appears in the above-identified patent and that said Letters Patent is hereby corrected as shown below:

<u>Title page,</u>
Item [57], ABSTRACT,
Line 8, "server objects is a list or replication" should read -- server object is a list of replication --.

Signed and Sealed this

Twenty-fourth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,457,011 B1
DATED : September 24, 2002
INVENTOR(S) : Brace et al.

It is certified that error appears in the above-identified patent and that said Letters Patent is hereby corrected as shown below:

<u>Title page,</u>
Item [57], ABSTRACT,
Line 8, "server objects is a list or replication" should read -- server object is a list of replication --.

Signed and Sealed this

Ninth Day of August, 2005

JON W. DUDAS
*Director of the United States Patent and Trademark Office*